United States Patent
Maeda et al.

(10) Patent No.: US 10,902,686 B2
(45) Date of Patent: Jan. 26, 2021

(54) ERRONEOUS COMMUNICATION PREVENTION DEVICE, TOLL COLLECTION SYSTEM, AND ERRONEOUS COMMUNICATION PREVENTION METHOD

(71) Applicant: MITSUBISHI HEAVY INDUSTRIES MACHINERY SYSTEMS, LTD., Hyogo (JP)

(72) Inventors: Takashi Maeda, Tokyo (JP); Satoshi Nozaki, Kobe (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 0 days.

(21) Appl. No.: 16/349,736

(22) PCT Filed: Nov. 22, 2016

(86) PCT No.: PCT/JP2016/084578
§ 371 (c)(1),
(2) Date: May 14, 2019

(87) PCT Pub. No.: WO2018/096578
PCT Pub. Date: May 31, 2018

(65) Prior Publication Data
US 2020/0074755 A1    Mar. 5, 2020

(51) Int. Cl.
*G07B 15/06* (2011.01)
*G06K 7/10* (2006.01)
(Continued)

(52) U.S. Cl.
CPC ....... *G07B 15/063* (2013.01); *G06K 7/10099* (2013.01); *G06K 19/0723* (2013.01); *G08G 1/017* (2013.01)

(58) Field of Classification Search
CPC ............ G07B 15/063; G06K 19/0723; G06K 7/10099; G08G 1/017
See application file for complete search history.

(56) References Cited

U.S. PATENT DOCUMENTS 6,233,519 B1 * 5/2001 Yamada ................. G01C 21/28
340/988
6,657,554 B1    12/2003 Terashima et al.
(Continued)

FOREIGN PATENT DOCUMENTS

JP    H1063902 A    3/1998
JP    H11271075 A   10/1999
(Continued)

OTHER PUBLICATIONS

International Search Report and Written Opinion for International Application No. PCT/JP2016/084578 dated Feb. 21, 2017; 17pp.

*Primary Examiner* — Ryan W Sherwin
(74) *Attorney, Agent, or Firm* — Kanesaka Berner and Partners, LLP

(57) ABSTRACT

Provided is an erroneous communication prevention device operable to prevent erroneous communication between an RFID tag installed in a vehicle and an RFID communication antenna disposed at a roadside. The erroneous communication prevention device includes an erroneous communication prevention antenna operable to transmit erroneous communication prevention electromagnetic waves toward an electromagnetic wave leakage monitoring region. The electromagnetic wave leakage monitoring region is outside an RFID communication region where the RFID tag performs valid communications with the RFID communication antenna. In addition, the electromagnetic wave leakage monitoring region is defined in a region where the RFID tag is enabled to perform communications using electromag- (Continued)

netic waves transmitted from the RFID communication antenna.

7 Claims, 6 Drawing Sheets

(51) Int. Cl.
*G06K 19/07* (2006.01)
*G08G 1/017* (2006.01)

(56) References Cited

U.S. PATENT DOCUMENTS

| | | |
|---|---|---|
| 2014/0267728 A1 | 9/2014 | Dahlin |
| 2015/0048159 A1 | 2/2015 | Martinez De Velasco Cortina et al. |

FOREIGN PATENT DOCUMENTS

| | | |
|---|---|---|
| JP | 2000137843 A | 5/2000 |
| JP | 2001068925 A | 3/2001 |
| JP | 2002260033 A | 9/2002 |
| JP | 2010231383 A | 10/2010 |

* cited by examiner

ERRONEOUS COMMUNICATION PREVENTION DEVICE, TOLL COLLECTION SYSTEM, AND ERRONEOUS COMMUNICATION PREVENTION METHOD

RELATED APPLICATIONS

The present application is a National Phase of International Application Number PCT/JP2016/084578 filed Nov. 22, 2016.

TECHNICAL FIELD

The disclosure relates to an erroneous communication prevention device, a toll collection system, and an erroneous communication prevention method.

BACKGROUND ART

In intelligent transport systems (ITSs), an electronic toll collection system (ETC (trade name), also referred to as an "automatic toll collection system") is widely applied as a system configured to automatically collect the tolls in toll roads. The electronic toll collection system allows the tolls of toll roads to be collected by means of dedicated short-range radio communications between onboard units installed in vehicles and roadside antennas (dedicated short-range communication antennas) installed in tollgates.

In addition, a toll collection system using an RFID (radio frequency identifier) has already been developed as a simplified version of the above-described electronic toll collection system. In the toll collection system using an RFID, an RFID communication antenna (also referred to as a "reader/writer") is installed as a roadside antenna, and an RFID tag (also referred simply to as an "IC tag") is installed in each vehicle. In this case, the RFID tag is a what is known as a "passive-type" tag, which transmits no electromagnetic waves. RFID tag obtains electric power needed for the actions from the electromagnetic waves (carrier waves) transmitted by the RFID communication antenna, and performs radio communications by superimposing a modulation signal over the reflected waves of the carrier wave.

A problem may arise in a case where communications are performed between an RFID communication antenna and an RFID tag. Specifically, the RFID communication antenna may establish unassumed communications (erroneous communications) with a vehicle located outside the RFID communication region defined for the valid RFID communications. Suppose a case, for example, where it is necessary to establish RFID communications only with a vehicle traveling on a first one of the lanes that are adjacent to each other among a plurality of lanes. In this case, if the electromagnetic waves transmitted from the RFID communication antenna leak to a second one of the lanes, unintended RFID communications may conceivably be established with a vehicle traveling on the second lane.

A measure to address the above-described problem is disclosed in, for example, Patent Document 1. What is disclosed is an automatic toll collection device including: a communication antenna provided to correspond to a lane of a toll road and operable to perform radio communications with an onboard radio apparatus installed in a mobile body (vehicle); and a region-limiting antenna disposed over a centerline between the toll road and an adjacent lane. The communication antenna creates a radio-communication region, a part of which extends out into the lane adjacent to the toll road. The region-limiting antenna is operable to transmit unmodulated, interfering electromagnetic waves to limit the extending-out part of the radio-communication region.

CITATION LIST

Patent Document

Patent Document 1: JP H10(1998)-063902 A

SUMMARY OF INVENTION

Problem to be Solved by the Invention

It is, however, technically difficult to limit, by use of other electromagnetic waves (interfering electromagnetic waves), only a part of the radio communication region (e.g., the part extending out into the adjacent lane) created by the communication antenna (roadside antenna) as in the case of Patent Document 1. Another conceivable method of limiting the radio communication region to be confined within a desired lane is use of an electromagnetic-wave shielding wall made, for example, of an electromagnetic-waves absorbing body. The method needs an increasing cost of installation and maintenance of the shielding wall.

To address the problems mentioned above, the disclosure provides an erroneous communication prevention device, a toll collection system, and an erroneous communication prevention method, all of which contribute to a simple system capable of reducing erroneous communications.

Solution to Problem

According to an aspect of the disclosure, an erroneous communication prevention device (1a) is operable to prevent erroneous communications between a signal-receiving medium (A1) installed in a vehicle (A) and a roadside antenna (20) disposed at a roadside. The erroneous communication prevention device includes an erroneous communication prevention antenna (21) operable to transmit erroneous communication prevention electromagnetic waves (E) toward an electromagnetic wave leakage monitoring region (Q2) outside a valid-communication region (Q1) where the signal-receiving medium normally performs valid communications with the roadside antenna. In addition, the electromagnetic wave leakage monitoring region is defined in a region where the signal-receiving medium is enabled to receive electromagnetic waves transmitted from the roadside antenna.

With this configuration, even in a case where the signal-receiving medium existing in the electromagnetic wave leakage monitoring region receives electromagnetic waves for communications transmitted from the roadside antenna, the signal-receiving medium cannot read a modulation signal superimposed on the electromagnetic waves for communications because the erroneous communication prevention electromagnetic waves are transmitted over the electromagnetic waves for communications. Hence, erroneous communications with the signal-receiving medium existing in the electromagnetic wave leakage monitoring region can be prevented.

In addition, the entire configuration of the erroneous communication prevention device can be a simple configuration because the configuration needs only an additional transmission-only antenna and an electromagnetic-wave source for the additional transmission-only antenna.

In addition, according to an aspect of the disclosure, the erroneous communication prevention electromagnetic waves have an equal carrier frequency to a carrier frequency of electromagnetic waves transmitted by the roadside antenna.

By tuning the frequency of the erroneous communication prevention electromagnetic waves to the carrier frequency of the electromagnetic waves transmitted by the roadside antenna, the signal-receiving medium is allowed to receive the erroneous communication prevention electromagnetic waves with high sensitivity. Hence, the signal-receiving medium can be more reliably prevented from reading the modulation signal of the electromagnetic waves transmitted by the roadside antenna.

In addition, according to an aspect of the disclosure, the signal-receiving medium is an RFID tag (A1), and the roadside antenna performs communications by means of the reflected waves of the electromagnetic waves having been transmitted by the roadside antenna toward the RFID tag.

With this configuration, the erroneous communication prevention device can be applied to a toll collection system using RFID.

In addition, according to an aspect of the disclosure, a toll collection system (1) includes the above-described erroneous communication prevention device, the roadside antenna, and an antenna controller (31) operable to perform toll-collecting communications with the signal-receiving medium via the roadside antenna.

In addition, according to an aspect of the disclosure, the roadside antenna of the above-described toll collection system is operable to perform valid communications with the signal-receiving medium existing in the valid-communication region defined on a lane on an elevated road. In addition, the erroneous communication prevention antenna is operable to transmit the erroneous communication prevention electromagnetic waves toward the electromagnetic wave leakage monitoring region defined on a lane under the elevated road.

In a case where toll-collecting communications are performed with a vehicle traveling on a lane on the elevated road, erroneous communications with a vehicle traveling on the lane under the elevated road can be prevented.

In addition, according to an aspect of the disclosure, the above-described toll collection system further includes a vehicle-position identifying device (4) installed in a vehicle. The vehicle-position identifying device includes: an electromagnetic-wave detection unit (402) operable to determine whether the erroneous communication prevention electromagnetic waves have been received; and a vehicle-position identifying unit (401) operable to identify, based on a positioning signal having been received from a satellite, where on a map the vehicle is positioned, and to identify, based on whether the erroneous communication prevention electromagnetic waves have been received, on which one of adjoining lanes the vehicle is positioned.

With this configuration, the vehicle-position identifying device is operable to identify, based on the result of determination of whether the erroneous communication prevention electromagnetic waves have been received, which one of the lanes is the lane on which the vehicle is traveling currently.

In addition, an erroneous communication prevention method according to an aspect of the disclosure is an erroneous communication prevention method of preventing erroneous communications between a signal-receiving medium installed in a vehicle and a roadside antenna disposed at a roadside. The erroneous communication prevention method includes transmitting erroneous communication prevention electromagnetic waves toward an electromagnetic wave leakage monitoring region. The electromagnetic wave leakage monitoring region is outside a valid-communication region where the signal-receiving medium performs valid communications with the roadside antenna. In addition, the electromagnetic wave leakage monitoring region is defined in a region where the signal-receiving medium is enabled to receive electromagnetic waves transmitted from the roadside antenna.

Advantageous Effect of Invention

According to the erroneous communication prevention device, the toll collection system, and the erroneous communication prevention method described above, erroneous communications can be reduced by use of a simple configuration.

DESCRIPTION OF EMBODIMENTS

First Embodiment

Figure 1:
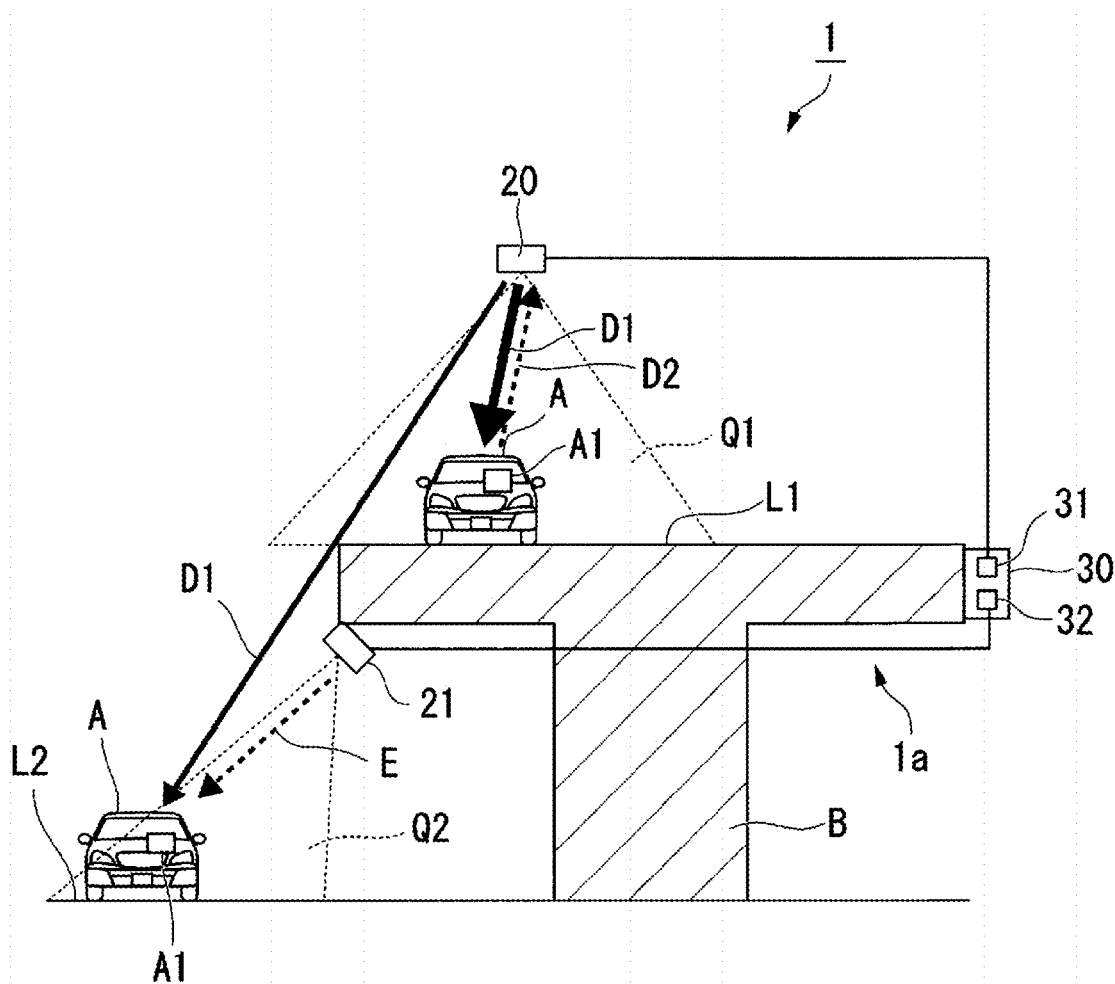
FIG. 1 is a diagram illustrating an overall configuration of a toll collection system according to a first embodiment.

A toll collection system and a communication control device according to a first embodiment will be described in detail below with reference to FIG. 1 to FIG. 3.
Overall Configuration of Toll Collection System FIG. 1 is a diagram illustrating an overall configuration of a toll collection system according to the first embodiment.

A toll collection system 1 according to the first embodiment is a system provided for an inlet lane or an outlet lane of a toll road (e.g., expressway) and operable to charge a vehicle traveling on the toll road.

A toll collection system 1 according to the present embodiment is a toll collection system operable to perform radio communications for collecting the toll by use of RFID (hereinafter, also referred simply to as "RFID communications") with a vehicle traveling on a particular lane and to also perform an electronic billing and payment (toll collection processing) without forcing the vehicle to stop.

Note that the following description of the toll collection system 1 according to the present embodiment is assumed to be a free-flow-type one, where the inlet or the outlet of the toll road has no tollgate and vehicles can keep on traveling on the lane without stopping while being charged. In a different embodiment, however, the toll collection system 1 is not limited to the above-described aspect. Instead, the toll collection system 1 may charge individually the vehicles one after another when each of the vehicles passes through the tollgate.

In addition, in the following description of the present embodiment, the RFID communications are assumed to be performed by use of electromagnetic waves of approximately 2.4 GHz. In a different embodiment, the electromagnetic waves to be used are not limited to the above-mentioned aspect. Instead, electromagnetic waves of, for example, 900 MHz band may be used.

The following description of the first embodiment is based on a case where the toll collection system 1 is installed on a bridge B.

As illustrated in FIG. 1, the toll collection system 1 includes an RFID communication antenna 20 (roadside antenna), an erroneous communication prevention antenna 21, and a lane control device 30. An antenna controller 31 and an electromagnetic-wave source 32 are provided in the lane control device 30.

In the present embodiment, an erroneous communication prevention device 1a includes the erroneous communication prevention antenna 21 and the electromagnetic-wave source 32.

The RFID communication antenna 20 is an antenna designed to be used in RFID communications between the lane control device 30 (i.e., the antenna controller 31) (to be described later) and an RFID tag A1 (signal-receiving medium) installed in the vehicle A. In the present embodiment, the RFID communication antenna 20 is installed on a road side (above) of a lane L1 on top of the bridge B, and sends electromagnetic waves for RFID communications towards a vehicle A traveling on the lane L1.

The directivity of the electromagnetic waves of the RFID communication antenna 20 has been tuned beforehand to allow the RFID communication antenna 20 to perform valid RFID communications with the vehicle A (i.e., the RFID tag A1) existing within a valid-communication region Q1 defined on the lane L1. It is not possible, however, to make the emitted electromagnetic waves reach accurately only within the valid-communication region Q1. The present embodiment (see FIG. 1) describes an example where a part of the electromagnetic waves transmitted by the RFID communication antenna 20 reaches a lane L2 under the bridge B.

The erroneous communication prevention antenna 21 transmits erroneous communication prevention electromagnetic waves E based on a high-frequency signal outputted by the electromagnetic-wave source 32 (to be described later). In the present embodiment, the erroneous communication prevention antenna 21 is a transmission-only antenna. The directivity of the erroneous communication prevention antenna 21 has been designed beforehand to allow the erroneous communication prevention electromagnetic waves E to be received by a vehicle A (i.e., RFID tag A1) that exists within an electromagnetic wave leakage monitoring region Q2 in the lane L2 under the bridge B. The above-mentioned electromagnetic wave leakage monitoring region Q2 is defined outside the valid-communication region Q1 and within a region where the RFID tag A1 can receive the electromagnetic waves transmitted from the RFID communication antenna 20. To put it differently, while the electromagnetic waves transmitted by the RFID communication antenna 20 installed above the lane L1 include electromagnetic waves transmitted towards outside of the valid-communication region Q1 (i.e., leaked electromagnetic waves), the electromagnetic wave leakage monitoring region Q2 is a region located on the lane L2 and allowing the reception of the leaked electromagnetic waves.

Note that the erroneous communication prevention antenna 21 is installed to transmit the erroneous communication prevention electromagnetic waves E downwards (towards the electromagnetic wave leakage monitoring region Q2) from the underside of the elevated road (i.e., the lane L1). Hence, the reception of the erroneous communication prevention electromagnetic waves E is impossible in the valid-communication region Q1 on the lane L1.

The lane control device 30 controls the overall toll collection processing in the toll collection system 1.

The antenna controller 31 of the lane control device 30 performs RFID communications for a vehicle A via the RFID communication antenna 20 with an RFID tag A1 installed in the vehicle A traveling on the lane L1. The above-mentioned RFID communications according to the present embodiment is what is known as "passive-type" RFID communications. Specifically, the RFID tag A1 does not have its own power source (e.g., a battery), and does not proactively transmit any electromagnetic waves. Instead, the RFID tag A1 acquires electric power from the electromagnetic waves for RFID communications transmitted from the RFID communication antenna 20, and performs a modulating operation. Specifically, the antenna controller 31 transmits, via the RFID communication antenna 20, electromagnetic waves for RFID communications containing a superimposed response request signal D1. Once received the response request signal D1, the RFID tag A1 uses the electric power obtained from the received electromagnetic waves and thus performs a modulating operation. Thus, a response signal D2 is superimposed on the reflected waves of the electromagnetic waves transmitted by the RFID communication antenna 20. The antenna controller 31 reads the response signal D2, and thus performs a toll collection processing for a particular vehicle A (i.e., a vehicle A traveling on the lane L1).

It should be noted that as the lane L1 is a free-flow lane, the antenna controller 31 has to incessantly perform RFID communications with a plurality of vehicles A traveling on the lane L1. Hence, the antenna controller 31 continuously transmits the response request signals D1.

The electromagnetic-wave source 32 outputs a high-frequency signal to make the erroneous communication prevention antenna 21 transmit the erroneous communication prevention electromagnetic waves E. Note that the carrier frequency of the erroneous communication prevention electromagnetic waves E is the same as the carrier frequency of the electromagnetic waves (i.e., the response request signal D1) transmitted by the RFID communication antenna 20. The electromagnetic-wave source 32 continuously outputs high-frequency signals along with the response request signals D1 transmitted continuously.

Figure 2:
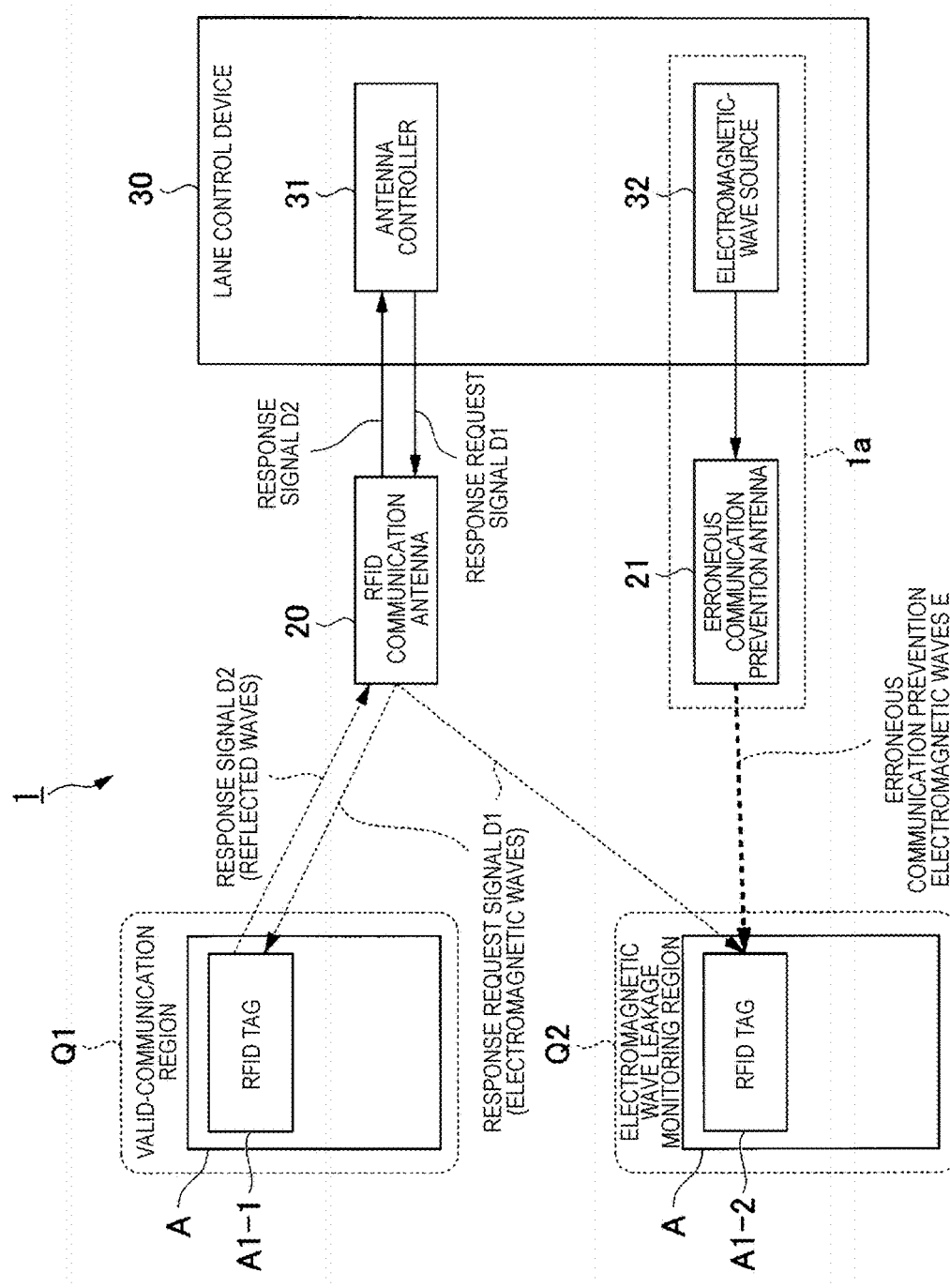
FIG. 2 is a block diagram illustrating a functional configuration of the toll collection system according to the first embodiment.

FIG. 2 is a block diagram illustrating a functional configuration of the toll collection system according to the first embodiment.

As illustrated in FIG. 2, the lane control device 30 includes the antenna controller 31 and the electromagnetic-wave source 32.

The antenna controller 31 is a main control device included in the lane control device 30, and performs communications for collecting the toll (i.e., RFID communications) with the RFID tag A1 via the RFID communication antenna 20.

As described earlier, the antenna controller 31 outputs the response request signal D1 towards the RFID communication antenna 20. The RFID communication antenna 20 applies an amplitude modulation to the carrier wave having a frequency of 2.4 GHz, superimposes the response request signal D1, and then transmits the resultant signal. The RFID tag A1 reads the response request signal D1 superimposed on the electromagnetic waves, and performs a modulation processing. Then, the RFID tag A1 modulates the reflected waves of the carrier waves and superimposes the response signal D2 on the modulated, reflected waves. Then, the antenna controller 31 reads the response signal D2 superimposed on the reflected waves, and then performs a toll collection processing.

As illustrated in FIG. 2, the response request signal D1 transmitted from the RFID communication antenna 20 is received mainly by an RFID tag A1-1 that exists in the valid-communication region Q1. Once the RFID tag A1-1 reads the response request signal D1 transmitted from the RFID communication antenna 20, the RFID tag A1-1 superimposes the response signal D2 over the reflected waves in response to the response request signal D1. Hence, valid RFID communications are performed with the vehicle A that exists within the valid-communication region Q1.

The response request signal D1 transmitted from the RFID communication antenna 20 may also reach outside of the valid-communication region Q1. For example, as illustrated in FIG. 2, the response request signal D1 may be transmitted also towards a vehicle A (i.e., an RFID tag A1-2) that exists in electromagnetic wave leakage monitoring region Q2 under the bridge B. In a case where the RFID tag A1-2 that exists under the elevated road reads the response request signal D1 transmitted from the RFID communication antenna 20, the RFID tag A1-2, as in the case of the RFID tag A1-1, superimposes the response signal D2 on the reflected waves. Hence, unintended RFID communications (erroneous communications) may result.

In the present embodiment, however, the RFID tag A1-2 that exists in the electromagnetic wave leakage monitoring region Q2 receives not only the electromagnetic waves transmitted by the RFID communication antenna 20 (with the superimposed response request signal D1) but also the erroneous communication prevention electromagnetic waves E transmitted by the erroneous communication prevention antenna 21, as illustrated in FIG. 2. An advantageous effect of the erroneous communication prevention antenna 21 transmitting the erroneous communication prevention electromagnetic waves E will be described below.

Figure 3:
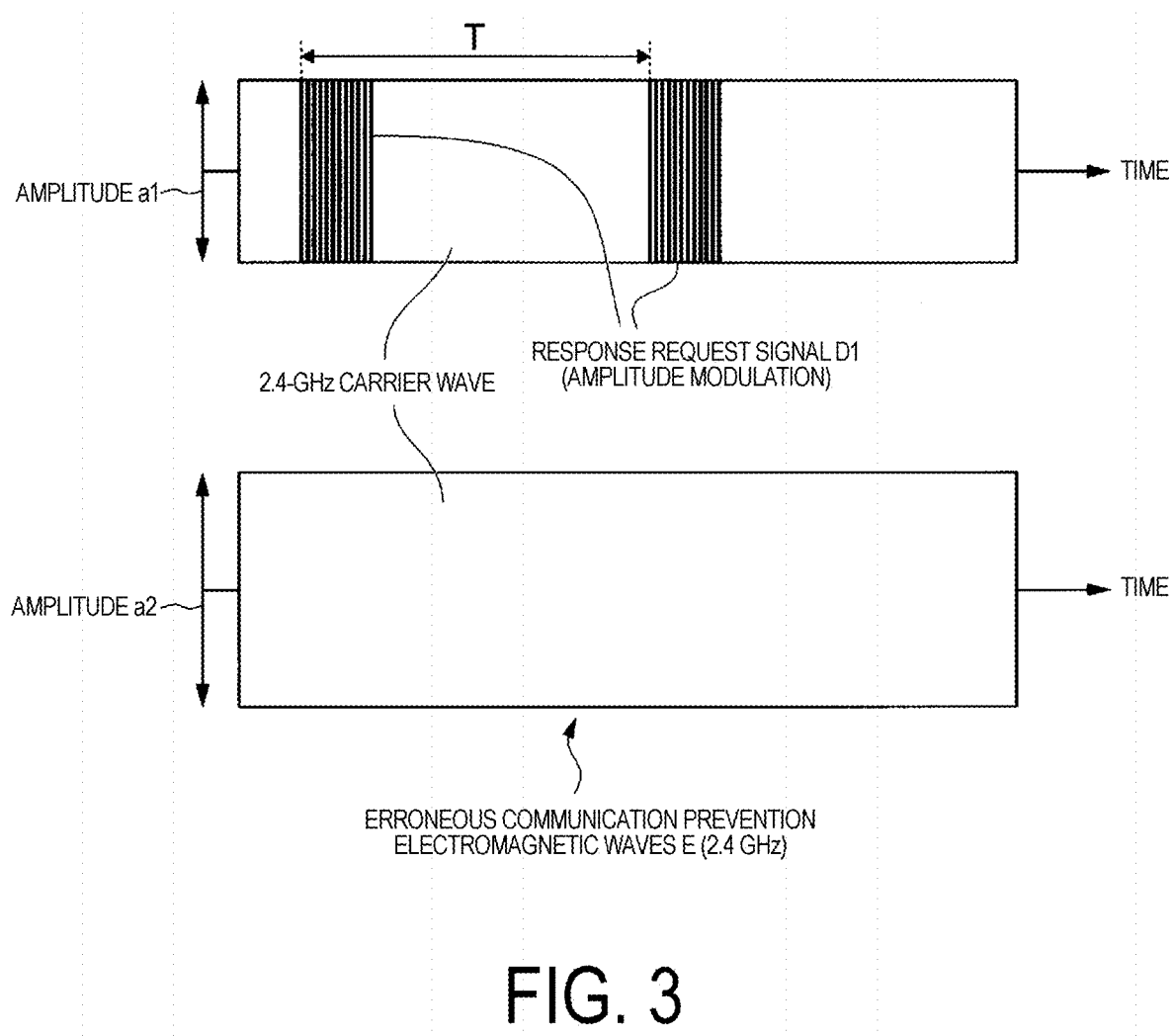
FIG. 3 is a diagram describing actions of an erroneous communication prevention device according to the first embodiment.

FIG. 3 is a diagram describing actions of an erroneous communication prevention device according to the first embodiment.

As illustrated in FIG. 3, a signal repeatedly amplitude-modulated at constant temporary intervals (i.e., the response request signal D1) is superimposed on the electromagnetic waves transmitted by the RFID communication antenna 20 (i.e., the carrier waves at 2.4 GHz). In a case where the RFID tag A1-1 (see FIG. 2) that exists in the valid-communication region Q1 reads the amplitude-modulated signal (i.e., the response request signal D1), the RFID tag A1-1 performs a processing of sending back a response signal D2.

On the other hand, the erroneous communication prevention electromagnetic waves E transmitted by the erroneous communication prevention antenna 21 are carrier waves at 2.4 GHz with no modulation at all. The RFID tag A1-2 that exists in the electromagnetic wave leakage monitoring region Q2 (see FIG. 2) receives not only the electromagnetic waves with the superimposed response request signal D1 but also the erroneous communication prevention electromagnetic waves E transmitted by the erroneous communication prevention antenna 21. Then, the erroneous communication prevention electromagnetic waves E are superimposed on the amplitude-modulated signal of the response request signal D1. Consequently, the RFID tag A1-2 that exists in the electromagnetic wave leakage monitoring region Q2 cannot read the amplitude-modulated signal of the response request signal D1 any longer. Hence, the RFID tag A1-2 does not perform the processing of sending back the response signal D2.

It should be noted that the erroneous communication prevention electromagnetic waves E transmitted by the erroneous communication prevention antenna 21 has an amplitude a2 that is preferably greater than an amplitude a1 of the electromagnetic waves transmitted by the RFID communication antenna 20 (i.e., the carrier waves on which the response request signal D1 is to be superimposed). With this configuration, the amplitude-modulated signal (i.e., the response request signal D1) can be made more difficult to be read by the RFID tag A1-2.

Advantageous Effects

As has been described thus far, the erroneous communication prevention device 1a according to the first embodiment includes the erroneous communication prevention antenna 21 operable to transmit the erroneous communication prevention electromagnetic waves E towards the electromagnetic wave leakage monitoring region Q2. The electromagnetic wave leakage monitoring region Q2 is outside the valid-communication region Q1 where the RFID tag A1 performs valid communications with the RFID communication antenna 20. In addition, the electromagnetic wave leakage monitoring region Q2 is defined in a region that allows the RFID tag A1 to receive the electromagnetic waves transmitted from the RFID communication antenna 20.

With this configuration, even in a case where the RFID tag A1 that exists in the electromagnetic wave leakage monitoring region Q2 receives the electromagnetic waves for RFID communications transmitted from the RFID communication antenna 20, the erroneous communication prevention electromagnetic waves E transmitted to be superimposed on the electromagnetic waves for RFID communications disable the RFID tag A1 to read the amplitude-modulated signal superimposed on the electromagnetic waves for RFID communications. Hence, erroneous communications with the RFID tag A1 that exists in the electromagnetic wave leakage monitoring region Q2 can be prevented.

In addition, as the erroneous communication prevention device 1a and the toll collection system 1 need only the addition of the transmission-only antenna (erroneous communication prevention antenna 21) operable to transmit the unmodulated signal (i.e., the erroneous communication prevention electromagnetic waves E) and the electromagnetic-wave source 32, the entire configuration of the erroneous communication prevention device 1a and the entire configuration of the toll collection system 1 can be simple ones.

In addition, the erroneous communication prevention electromagnetic waves E according to the present embodiment have the same carrier frequency as the carrier frequency of the electromagnetic waves transmitted by the RFID communication antenna 20 (i.e., 2.4 GHz).

The antenna of the above-mentioned RFID tag A1 is designed to be most highly sensitive to the frequency (2.4 GHz) of the electromagnetic waves transmitted by the RFID communication antenna 20 and assumed to be received by the antenna of the above-mentioned RFID tag A1. Hence, by tuning the frequency of the erroneous communication prevention electromagnetic waves E to the carrier frequency of the electromagnetic waves transmitted by the RFID communication antenna 20, the erroneous communication prevention electromagnetic waves E can be received by the RFID tag A1 with high sensitivity. Accordingly, while the RFID tag A1 exists in the electromagnetic wave leakage monitoring region Q2, the RFID tag A1 is more reliably disabled to read the amplitude-modulated signal (i.e., response request signal D1).

In addition, in a case where the electromagnetic waves transmitted by the erroneous communication prevention antenna 21 are the same as the electromagnetic waves transmitted by the RFID communication antenna 20, an antenna designed as an equivalent to the RFID communication antenna 20 can be used as the erroneous communication prevention antenna 21. Hence, it is not necessary to take the trouble to design and manufacture a new antenna.

In addition, according to the toll collection system 1 of the present embodiment, the RFID communication antenna 20 performs valid communications with the RFID tag A1 that exists in the valid-communication region Q1 defined on the lane L1 of the elevated road. In addition, the erroneous communication prevention antenna 21 transmits the erroneous communication prevention electromagnetic waves E towards the electromagnetic wave leakage monitoring region Q2 defined on the lane L2 under the elevated road.

With this configuration, in a case where RFID communications (i.e., a toll collection processing) are performed for a vehicle traveling on the lane L1 of the elevated road, erroneous communications with a vehicle traveling on the lane L2 under the elevated road of the lane L1 can be prevented.

Modified Example

The toll collection system 1 and the erroneous communication prevention device 1a according to the first embodiment have been described in detail thus far. However, specific aspects of the toll collection system 1 and of the erroneous communication prevention device 1a according to the first embodiment are not limited to the ones described above. Various design modifications may be made without departing from the gist thereof.

For example, the toll collection system 1 according to the first embodiment is installed for the lane L1 on top of the bridge B and for the lane L2 under the bridge B. In another embodiment, the toll collection system 1 is not limited to the above-described aspect.

For example, the lanes L1 and L2 may be two roads separated from each other by means of a fence, a median strip, or the like, and built side by side with each other on the same plane.

In addition, the toll collection system 1 according to the first embodiment has been described as an aspect using passive-type RFID communications between the RFID communication antenna 20 and the RFID tag A1. In another embodiment, the toll collection system 1 is not limited to the above-described aspect.

Alternatively, for example, active-type RFID communications may be used where an onboard unit corresponding to the RFID tag A1 is configured to proactively transmit electromagnetic waves and send a response signal D2 towards the RFID communication antenna 20. Still alternatively, dedicated short-range communications (DSRC) may be used.

In addition, the erroneous communication prevention device 1a according to the first embodiment has been described as one that continuously outputs the erroneous communication prevention electromagnetic waves E from the erroneous communication prevention antenna 21. In another embodiment, the erroneous communication prevention device 1a is not limited to the above-described aspect.

Alternatively, for example, the electromagnetic-wave source 32 of the erroneous communication prevention device 1a according to another embodiment may be an aspect where the electromagnetic-wave source 32 transmits the erroneous communication prevention electromagnetic waves E during a minimum necessary period in synchronization with the antenna controller 31 and at the timing when the response request signal D1 is superimposed on the carrier waves (i.e., in the "cycle T" in FIG. 3). With this configuration, the transmission of the erroneous communication prevention electromagnetic waves E is performed only for a limited length of time, and consequently, it is possible to save the electric power.

Second Embodiment

Next, a toll collection system and a communication control device according to a second embodiment will be described in detail below with reference to FIG. 4 to FIG. 6.

Figure 4:
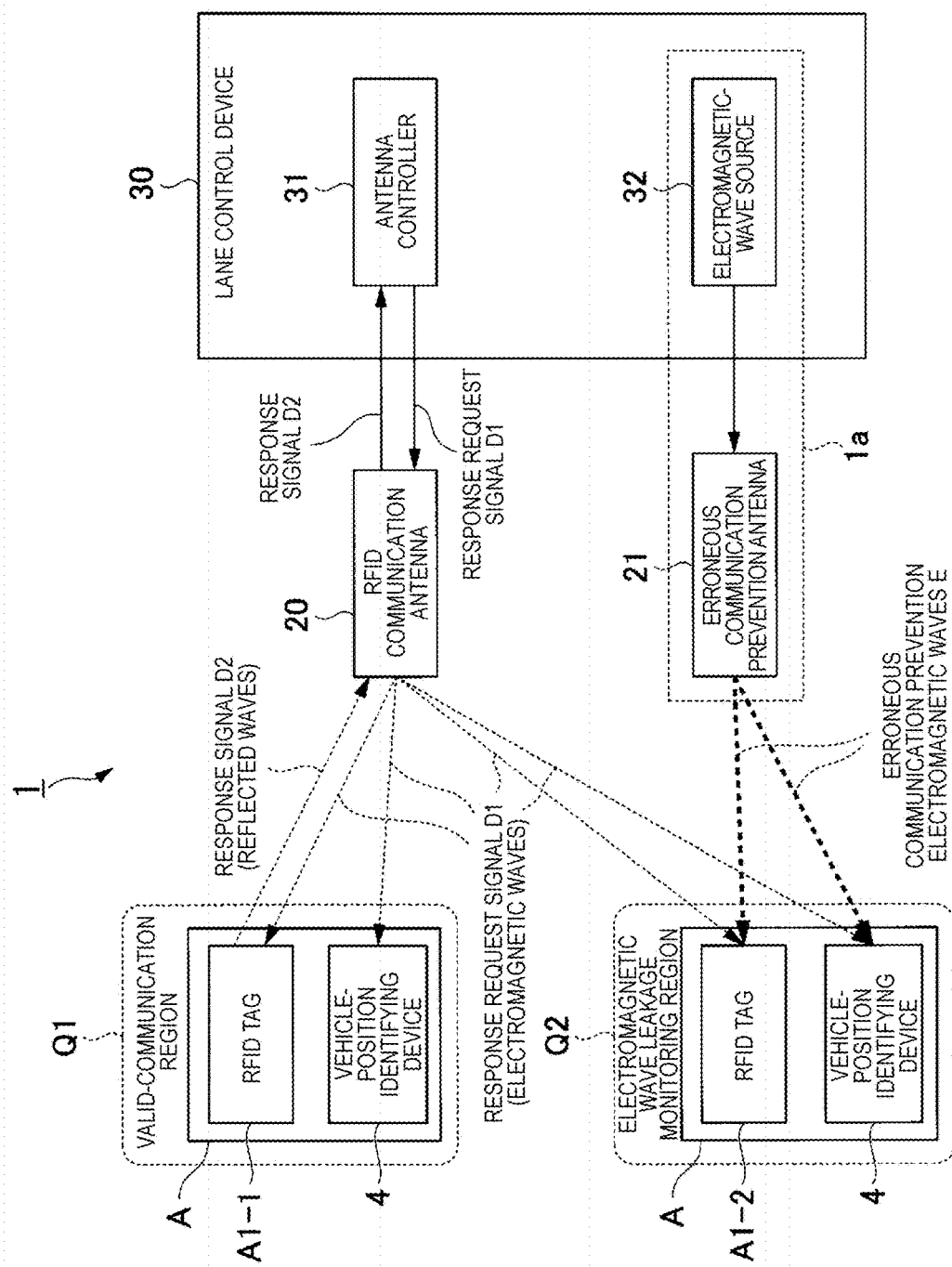
FIG. 4 is a block diagram illustrating a functional configuration of a toll collection system according to a second embodiment.

FIG. 4 is a block diagram illustrating a functional configuration of a toll collection system according to the second embodiment.

As illustrated in FIG. 4, the toll collection system 1 according to the second embodiment differs from the toll collection system 1 according to the first embodiment in that the former has not only the same configuration as that of the first embodiment but also includes a vehicle A equipped with a vehicle-position identifying device 4.

The vehicle-position identifying device 4 is, for example, what is known as an automotive navigation system that indicates the position of the vehicle on a map by use of the global navigation satellite system (GNSS).

As illustrated in FIG. 4, the vehicle-position identifying device 4 according to the present embodiment is operable to receive electromagnetic waves having a carrier frequency of 2.4 GHz, that is, the electromagnetic waves for RFID communications (i.e., electromagnetic waves with the superimposed response request signal D1) transmitted by the RFID communication antenna 20 and the erroneous communication prevention electromagnetic waves E transmitted by the erroneous communication prevention antenna 21.

In particular, as in the case of the RFID tags A1-1 and A1-2 according to the first embodiment (see FIG. 2), the vehicle-position identifying device 4 that exists in the valid-communication region Q1 receives only the electromagnetic waves for RFID communications transmitted from the RFID communication antenna 20. In addition, the vehicle-position identifying device 4 that exists in the electromagnetic wave leakage monitoring region Q2 is operable to receive both the electromagnetic waves for RFID communications transmitted from the RFID communication antenna 20 and the erroneous communication prevention electromagnetic waves E transmitted from the erroneous communication prevention antenna 21.

Figure 5:
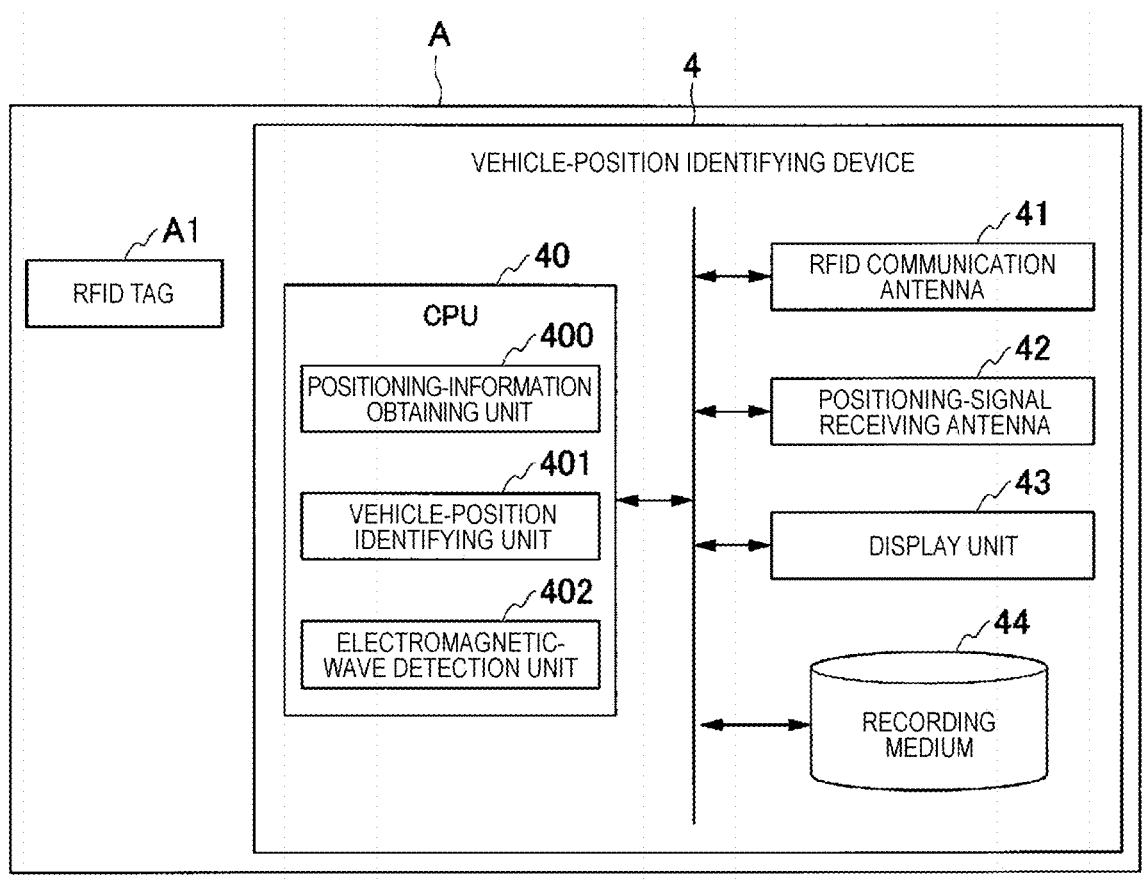
FIG. 5 is a diagram illustrating a functional configuration of a vehicle-position identifying device according to the second embodiment.

FIG. 5 is a diagram illustrating a functional configuration of a vehicle-position identifying device according to the second embodiment.

As illustrated in FIG. 5, the vehicle A according to the second embodiment is equipped with not only the RFID tag A1 but also the vehicle-position identifying device 4.

The vehicle-position identifying device 4 includes a CPU 40, an RFID-receiving antenna 41, a positioning-signal receiving antenna 42, a display unit 43, and a recording medium 44.

The CPU 40 is a processor configured to govern overall operations of the vehicle-position identifying device 4 and operable to perform various functions by operating in accordance with predetermined programs. Functions of the CPU 40 included in the vehicle-position identifying device 4 will be described later.

The RFID-receiving antenna 41 is an antenna operable to receive carrier waves having a carrier frequency of 2.4 GHz. The RFID-receiving antenna 41 may be designed as an equivalent to the antenna included in the RFID tag A1.

The positioning-signal receiving antenna 42 is operable to receive a positioning signal transmitted from a satellite of the global navigation satellite system (GNSS).

The display unit 43 is a display panel operable to display the position of one's own vehicle on a map. An example of the display unit 43 is a liquid crystal display apparatus.

The recording medium 44 has map information, etc. stored therein beforehand.

Next, operations of the CPU 40 will be described below.

The CPU 40 performs functions of: a positioning-information obtaining unit 400; a vehicle-position identifying unit 401; and an electromagnetic-wave detection unit 402.

Based on the positioning signal received through the positioning-signal receiving antenna 42 from the satellite, the positioning-information obtaining unit 400 obtains the current positioning information (i.e., the information indicating the latitude and longitude) of its own vehicle.

Based on the positioning information obtained by the positioning-information obtaining unit 400 and the map information stored in the recording medium 44, the vehicle-position identifying unit 401 performs a map matching processing, which is a known technique. Hence, based on the positioning information, the vehicle-position identifying unit 401 identifies where on the map its own vehicle exists.

The electromagnetic-wave detection unit 402 determines whether the erroneous communication prevention electromagnetic waves E have been received.

In addition, the vehicle-position identifying unit 401 according to the present embodiment has a function to identify on which one of the adjoining roads the vehicle A exists. The determination by the vehicle-position identifying unit 401 is based on whether the erroneous communication prevention electromagnetic waves E have been received. This function will be described in detail below.

Figure 6:
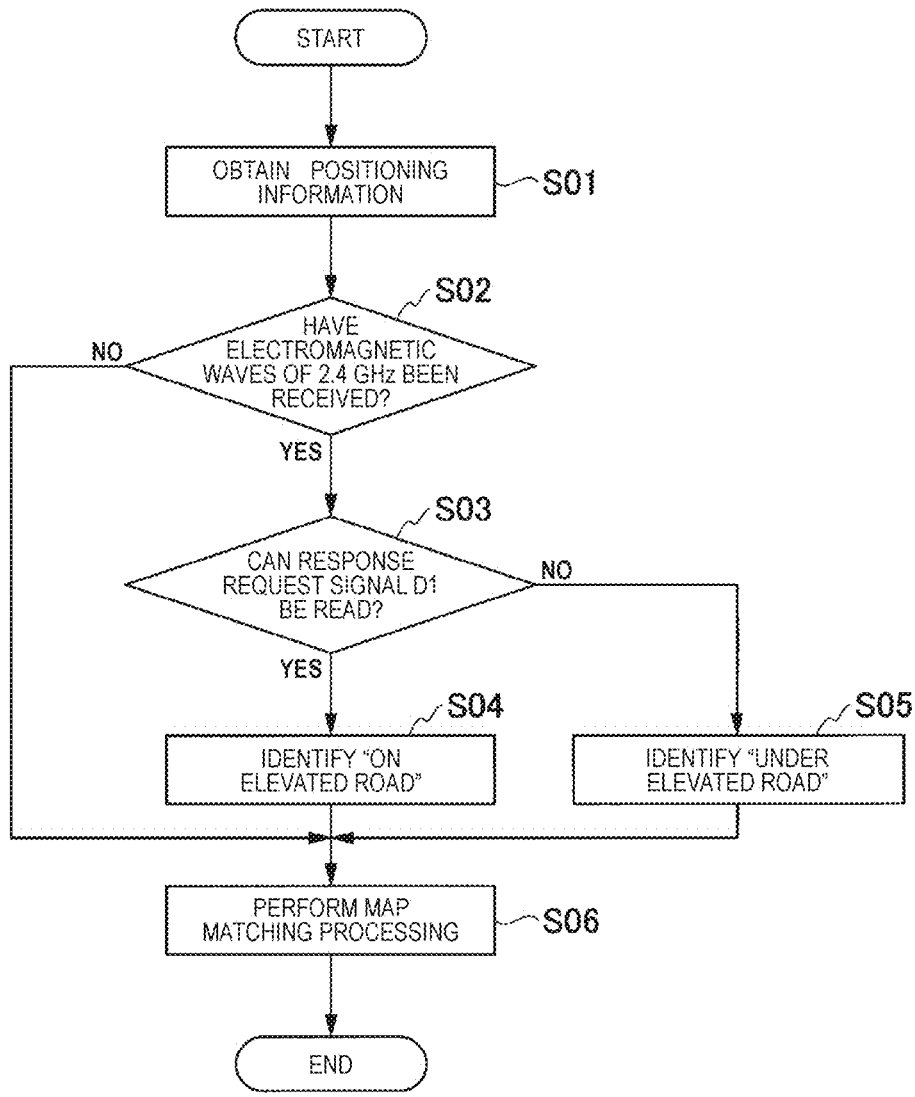
FIG. 6 is a diagram illustrating a processing flow of the vehicle-position identifying device according to the second embodiment.

FIG. 6 is a diagram illustrating a processing flow of the vehicle-position identifying device according to the second embodiment.

The processing flow illustrated in FIG. 6 is repeatedly performed by the CPU 40 of the vehicle-position identifying device 4.

Based on the positioning signal received from a satellite through the positioning-signal receiving antenna 42, the positioning-information obtaining unit 400 of the CPU 40 obtains the positioning information including the latitude information and the longitude information of the vehicle A (Step S01).

Then, the electromagnetic-wave detection unit 402 of the CPU 40 determines whether the electromagnetic waves of 2.4 GHz have been received through the RFID-receiving antenna 41 (Step S02).

In a case where no electromagnetic waves of 2.4 GHz have been received (NO at Step S02), the vehicle-position identifying unit 401 of the CPU 40 performs the known processing: performing a map matching processing based on the positioning information obtained at Step S01 to identify the position of the vehicle A on the map (Step S06).

In contrast, in a case where electromagnetic waves of 2.4 GHz have been received (YES at Step S02), the RFID-receiving antenna 41 is expected to receive either the electromagnetic waves for RFID communications transmitted by the RFID communication antenna 20 (see FIG. 4) (i.e., electromagnetic waves with the superimposed response request signal D1) or the erroneous communication prevention electromagnetic waves E transmitted by the erroneous communication prevention antenna 21 (see FIG. 4).

Then, the electromagnetic-wave detection unit 402 determines whether the response request signal D1 can be read from the electromagnetic waves of 2.4 GHz received through the RFID-receiving antenna 41 (Step S03).

In a case where the response request signal D1 can be read from the electromagnetic waves of 2.4 GHz received through the RFID-receiving antenna 41 (YES at Step S03), the RFID-receiving antenna 41 is expected to have received the electromagnetic waves for RFID communications transmitted by the RFID communication antenna 20 (that is, the RFID-receiving antenna 41 has received no erroneous communication prevention electromagnetic waves E). Hence, based on this result, the vehicle-position identifying unit 401 identifies the position of the vehicle A as one "on the elevated road" (Step S04).

In contrast, in a case where no response request signal D1 can be read from the electromagnetic waves of 2.4 GHz received through the RFID-receiving antenna 41 (NO at Step S03), the RFID-receiving antenna 41 is expected to have received mainly the erroneous communication prevention electromagnetic waves E. Hence, based on this result, the vehicle-position identifying unit 401 identifies the position of the vehicle A as one "under the elevated road" (Step S05).

Based on the result of identifying the position of the vehicle A obtained at either Step S04 or Step S05 (identification result indicating on which one of the adjoining lanes L1 and L2 the vehicle A is positioned), vehicle-position identifying unit 401 performs a map matching processing (Step S06).

Advantageous Effects

As has been described thus far, the toll collection system 1 according to the second embodiment further includes the vehicle-position identifying device 4 installed in the vehicle A. The vehicle-position identifying device 4 includes: the electromagnetic-wave detection unit 402 operable to determine whether the erroneous communication prevention electromagnetic waves E have been received; and the vehicle-position identifying unit 401 operable to identify, based on the positioning signal received from the satellite, where on the map the vehicle A is positioned. In addition, the vehicle-position identifying unit 401 is operable to identify, based on the result of determination of whether the erroneous communication prevention electromagnetic waves E have been received, on which one of the adjoining lanes L1 and L2 the vehicle A is positioned.

With this configuration, the vehicle-position identifying device 4 is operable to identify, based on the result of determination of whether the erroneous communication prevention electromagnetic waves E have been received, which one of the two adjoining lanes is the lane on which the vehicle A is traveling currently. Hence, based on a premise that the erroneous communication prevention electromagnetic waves E are the electromagnetic waves that can be received only by a vehicle existing in the electromagnetic wave leakage monitoring region Q2, the vehicle-position identifying device 4 can identify the lane on which the vehicle A is traveling.

Modified Example

The toll collection system 1, the erroneous communication prevention device 1a, and the vehicle-position identifying device 4 according to the second embodiment have been described in detail thus far. However, specific aspects of the toll collection system 1, the erroneous communication prevention device 1a, and the vehicle-position identifying device 4 according to the second embodiment are not limited to the ones described above. Various design modifications may be made without departing from the gist thereof.

For example, the vehicle A according to the second embodiment has been described as an aspect where the vehicle A is equipped with both the RFID tag A1 and the vehicle-position identifying device 4 (see FIG. 5). In another embodiment, the vehicle A is not limited to the above-described aspect.

For example, in another embodiment, the RFID tag A1 and the vehicle-position identifying device 4 may be integrated into a single body. Specifically, the CPU 40 of the vehicle-position identifying device 4 may have a function to superimpose the response signal D2 on the reflected waves in a case where response request signal D1 has been read through the RFID-receiving antenna 41. With this configuration, the vehicle-position identifying device 4, in lieu of the RFID tag A1, can perform RFID communications with the antenna controller 31 and with the RFID communication antenna 20.

Note that, in the embodiments described above, a program for achieving various functions of the vehicle-position identifying device 4(CPU 40) is recorded in a computer readable storing medium, and a computer system is caused to read and execute the program that is recorded in the storage medium to implement various processes. Additionally, the steps of each process of the vehicle-position identifying device 4 described above are stored in a computer readable recording medium in the form of a program, and these various processes are implemented by the computer reading out and executing this program. Examples of the computer-readable recording medium include magnetic disks, magneto-optical disks, CD-ROMs, DVD-ROMs, and semiconductor memories. This computer program may be distributed to the computer on a communication line, and the computer that receives this distribution may execute the program.

The vehicle-position identifying device 4 is not limited to the aspect in which the various functional elements are encased in a single device casing. The various functional elements of the vehicle-position identifying device 4 may be distributed in a plurality of network-connected devices.

In the foregoing, certain embodiments of the present invention have been described, but these embodiments are merely illustrative and are not intended to limit the scope of the invention. These embodiments may be implemented in various other forms, and various omissions, substitutions, and alterations may be made without departing from the gist of the invention. These embodiments and modifications are included in the scope and gist of the invention and are also included in the scope of the invention described in the claims and equivalents thereof.

INDUSTRIAL APPLICABILITY

According to the communication control device, the toll collection system, the communication control method, and the communication control program, erroneous communications can be reduced by use of a simple configuration.

REFERENCE SIGNS LIST

1 Toll collection system
1a Erroneous communication prevention device
20 RFID communication antenna (roadside antenna)
21 Erroneous communication prevention antenna
30 Lane control device
31 Antenna controller
32 Electromagnetic-wave source
4 Vehicle-position identifying device
40 CPU
400 Positioning-information obtaining unit
401 Vehicle-position identifying unit
402 Electromagnetic-wave detection unit
41 RFID-receiving antenna
42 Positioning-signal receiving antenna
43 Display unit
44 Recording medium
A Vehicle
A1 RFID tag (signal-receiving medium)
Q1 Valid-communication region
Q2 Radio wave leakage monitoring region
L1, L2 Lane
B Bridge

The invention claimed is:

1. An erroneous communication prevention device operable to prevent erroneous communications between a signal-receiving medium installed in a vehicle and a roadside antenna disposed at a roadside, the erroneous communication prevention device comprising:
an erroneous communication prevention antenna operable to transmit erroneous communication prevention electromagnetic waves toward an electromagnetic wave leakage monitoring region outside a valid-communication region where the signal-receiving medium performs valid communications with the roadside antenna, the electromagnetic wave leakage monitoring region being defined in a region where the signal-receiving medium is enabled to receive electromagnetic waves transmitted from the roadside antenna,
wherein the erroneous communication prevention electromagnetic waves are transmitted in synchronization with a cycle of the electromagnetic waves transmitted from the roadside antenna.

2. The erroneous communication prevention device according to claim 1,
wherein the erroneous communication prevention electromagnetic waves have an equal carrier frequency to a carrier frequency of electromagnetic waves transmitted by the roadside antenna.

3. The erroneous communication prevention device according to claim 1,
wherein the signal-receiving medium is a Radio Frequency Identifier (RFID) tag, and
the roadside antenna performs communications via reflected waves of electromagnetic waves having been transmitted toward the RFID tag.

4. A toll collection system comprising:
the erroneous communication prevention device according to claim 1;
the roadside antenna; and
an antenna controller operable to perform toll-collecting communications with the signal-receiving medium via the roadside antenna.

5. The toll collection system according to claim 4,
wherein the roadside antenna is operable to perform valid communications with the signal-receiving medium existing in the valid-communication region defined on a lane on an elevated road, and
the erroneous communication prevention antenna is operable to transmit the erroneous communication prevention electromagnetic waves toward the electromagnetic wave leakage monitoring region defined on a lane under the elevated road.

6. The toll collection system according to claim 4, further comprising:
a vehicle-position identifying device installed in a vehicle,
wherein the vehicle-position identifying device includes:
an electromagnetic-wave detection unit operable to determine whether or not the erroneous communication prevention electromagnetic waves have been received; and
a vehicle-position identifying unit operable to identify, based on a positioning signal having been received from a satellite, where on a map the vehicle is positioned, and to identify, based on whether the erroneous communication prevention electromagnetic waves have been received, on which one of adjoining lanes the vehicle is positioned.

7. An erroneous communication prevention method of preventing erroneous communications between a signal-receiving medium installed in a vehicle and a roadside antenna disposed at a roadside, the erroneous communication prevention method comprising:
transmitting erroneous communication prevention electromagnetic waves toward an electromagnetic wave leakage monitoring region outside a valid-communication region where the signal-receiving medium performs valid communications with the roadside antenna, the electromagnetic wave leakage monitoring region being defined in a region where the signal-receiving medium is enabled to receive electromagnetic waves transmitted from the roadside antenna,
wherein the erroneous communication prevention electromagnetic waves are transmitted in synchronization with a cycle of the electromagnetic waves transmitted from the roadside antenna.

* * * * *